(No Model.)
O. MUSSINAN, Jr.
ERASIVE PENCIL TIP.
No. 423,568. Patented Mar. 18, 1890.
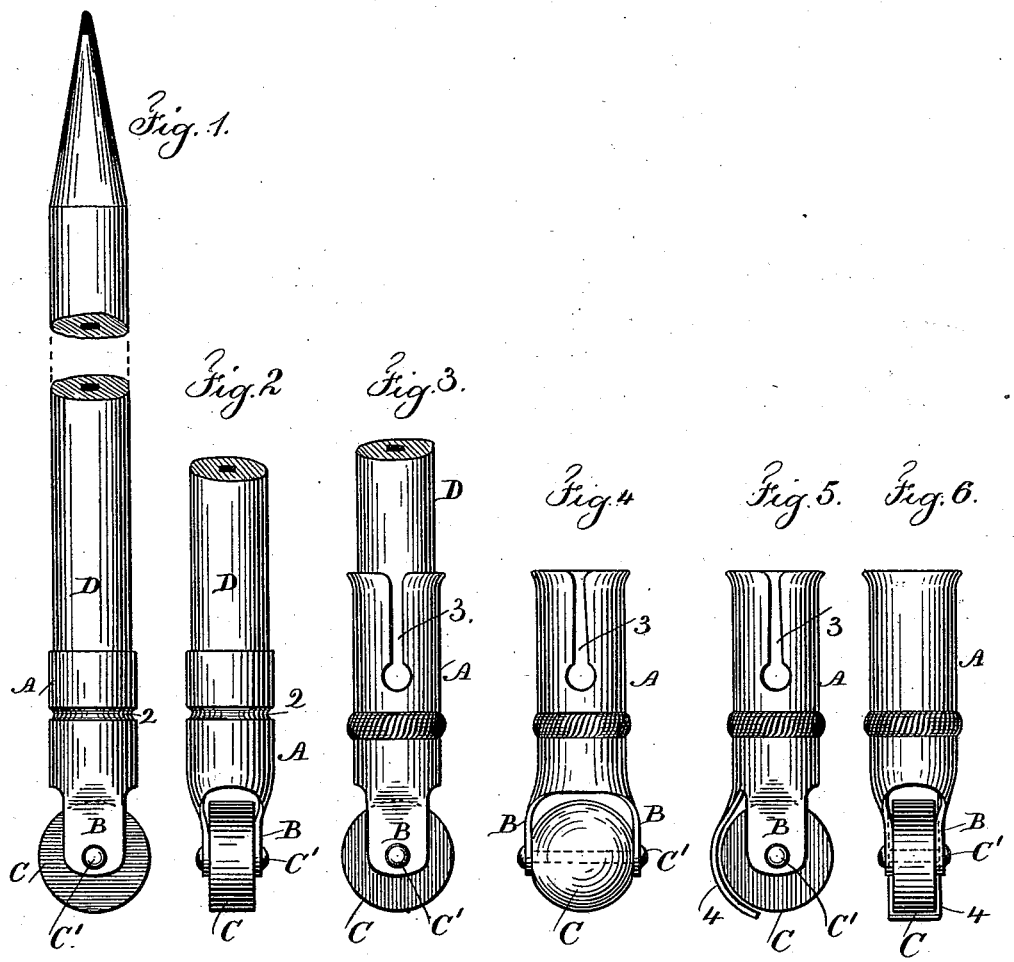

UNITED STATES PATENT OFFICE.

OSCAR MUSSINAN, JR., OF NEW YORK, N. Y., ASSIGNOR TO EBERHARD FABER, OF SAME PLACE.

ERASIVE PENCIL-TIP.

SPECIFICATION forming part of Letters Patent No. 423,568, dated March 18, 1890.

Application filed October 28, 1889. Serial No. 328,455. (No model.)

*To all whom it may concern:*

Be it known that I, OSCAR MUSSINAN, Jr., a citizen of the United States, residing in the city and State of New York, have invented an Improvement in Erasive Pencil-Tips, of which the following is a specification.

Lead-pencils have heretofore been provided with an erasive end rubber in a metallic holder, the pencil-handle forming a support for the holder when using the erasive rubber. In these cases the erasive rubber has projected, usually in the form of a cylinder, from the end of the tubular metallic holder, and the wear upon the rubber in erasing pencil-marks comes only upon the projecting end.

My improvement is adapted to holding a circular rubber upon a pivot-pin in such a manner that the circular eraser can be revolved from time to time to bring into action a fresh erasive surface, this allowing for the rubber being worn away uniformly and gradually until but a small piece of such erasive rubber remains in the holder.

In the drawings, Figure 1 is a side view, and Fig. 2 an edge view, of the erasive pencil-tip, and Figs. 3, 4, 5, and 6 are similar views showing the erasive rubber as held in removable metal clips or holders, all the figures being in a magnified size.

The holder A is of sheet metal or other suitable material, and it is to be provided with jaws B, between which is received the erasive rubber C, and through the jaws and the erasive rubber the pivot pin, screw, or rivet C' passes.

The tubular holder A may be permanently secured to the end of a pencil D by pressing a groove 2 into the sheet metal, and thereby clamping the holder A to the pencil-handle D; or the tubular holder A may be slotted longitudinally, as at 3, so as to form a spring-cylinder, into which the end of the pencil is inserted and frictionally held.

The erasive rubber C is shown as a short cylinder in all the figures, except Fig. 4, where it is represented as globular. Under all circumstances the erasive rubber should be circular, or nearly so, in order that it may be revolved upon the axis or pin C' by the pressure of the thumb or finger, and it is to be understood that the rubber is compressed sufficiently between the jaws B to prevent the circular rubber turning freely, so that the edge or periphery of such circular rubber may be made use of in erasing pencil-marks, but that in so doing the erasive rubber will be rotated more or less either by contact with the paper or by the thumb or finger, so as to bring into action a fresh portion of the periphery of the erasive rubber and cause a uniform or nearly uniform wear all around such erasive rubber.

In Figs. 5 and 6 I have represented a friction-tongue 4 as projecting from the end of the holder A, adjacent to one edge of the erasive rubber C, in order that the finger may be pressed upon this friction-tongue to prevent the erasive rubber revolving too freely while in use. This erasive tongue prevents the finger coming directly into contact with the periphery of the erasive rubber, and may be employed with advantage especially by mechanics and others where the fingers are liable to be soiled and the rubber to be smeared if brought into direct contact therewith, and thereby defeat the cleaning action of the rubber.

In cases where the erasive rubber C is employed globular, as shown in Fig. 4, the same possesses a greater surface of rubber to be worn away by the act of erasing than is the case with the short cylinder C.

I claim as my invention—

1. The combination, with a holder adapted to fit upon a pencil and having jaws, of a circular erasive rubber capable of being revolved, and a pin or axis passing through the jaws and through the rubber, substantially as set forth.

2. The tubular holder of sheet metal or similar material, slotted longitudinally and adapted to fit upon a pencil, and having projecting jaws B at one end thereof, in combination with a circular erasive rubber introduced between the jaws, and an axis or pin for connecting the rubber and jaws, substantially as set forth.

3. The holder slotted longitudinally and adapted to fit upon a pencil and having jaws projecting at one end, in combination with an erasive rubber received between such jaws and connected therewith by an axis, upon which the circular rubber can be revolved, substantially as set forth.

4. The tubular holder A, having jaws B projecting at one end, and a friction-tongue 4, in combination with a circular erasive rubber received between the jaws and an axis upon which the erasive rubber can be revolved, substantially as set forth.

Signed by me this 22d day of October, 1889.

O. MUSSINAN, Jr.

Witnesses:
 GEO. T. PINCKNEY,
 HAROLD SERRELL.